Patented Dec. 18, 1951

2,578,770

UNITED STATES PATENT OFFICE 2,578,770

COATING COMPOSITION AND POLYSTYRENE SURFACE COATED THEREWITH

Luther L. Yaeger, Hammond, Ind., assignor to Nash-Kelvinator Corporation, Kenosha, Wis., a corporation of Maryland No Drawing. Application February 21, 1947, Serial No. 730,207

5 Claims. (Cl. 260—17)

This invention relates to articles made of polystyrene and more specifically to such articles, covered with a surface coating which imparts to them a greatly enhanced resistance to abrasives, solvents and to other destructive influences; to modes of preparing and applying such surface coating materials for polystyrene.

Polystyrene is a widely employed construction material. For example, it is being used in refrigeration equipment and also in automotive and aircraft industries for structural as well as decorative purposes. However, the utility of polystyrene is greatly restricted by certain undesirable properties, namely: 1, Very high electrostatic charges which cause excessive attraction for dust. 2, High susceptibility to scratching. (This does not bear a direct relation to the hardness of the article, inasmuch as the optical effects of scratching are more pronounced with polystyrene than with certain other material which actually have a lower hardness, such as for example acrylates.) 3, Clouding or dissolving of the styrene surface by commonly used cleaning fluids.

Any one of these reasons is sufficient to greatly reduce the applicability of polystyrene as a material for many articles where it would otherwise be desirable by virtue of its excellent physical and mechanical properties and its relatively low price.

In the past, it has been attempted to apply to polystyrene various kinds of coating for added surface protection and to improve its properties. These attempts have all been unsuccesssful. Coatings of shellac, while soluble in solvents which do not attack the polystyrene are not sufficiently tenacious to give the protection desired. Furthermore, they are soluble in alcoholic cleaning fluids. Ethyl cellulose coatings for the polystyrenes and their derivatives have also been tried, and while these possess a considerable resistance to many solvent and to electrostatic influences they are not very scratch resistant, and, above all, they fail to bond to the polystyrene. It can be said generally that these coatings of prior art which bond to the polystyrene so as not to become detached therefrom are soluble only in solvents which are also solvents for polystyrene, and which therefore etch and cloud it and that coatings of prior art reasonably suitable in other regards fail to adhere to polystyrene.

The present invention has for an object to overcome the disadvantages just mentioned. Another object is to provide a novel coating for polystyrene, which forms an integral bond therewith, and which imparts to polystyrene enhanced resistance to scratching, reduced electrostatic sensitivity, and greatly enhances resistance to cleaning fluids. A further object is a process of applying to the polystyrene articles a protective coating integrally bonded thereto. Further objects will become apparent as the following detailed description proceeds.

In my search for film forming material which would meet the required characteristics, I endeavored for a long time to find a way to use cellulose acetate. Cellulose acetate has the highest mar resistance of any industrially used coating material. In addition it has exceedingly good moisture resistance. However, even after many hundreds of experiments I was unable to find any way in which a cellulose acetate coating could be brought to adhere to polystyrene.

Probing along a different path, I had also investigated the diallyl phthalate type of resins, for capacity to form suitable coatings. Diallyl phthalates likewise give a transparent and very abrasive resistant surface. Yet, even after many hundreds of experiments I was unable to use diallyl phthalate successfully with styrene, because the diallyl phthalate in its lower polymerized states is an active solvent for styrene. Therefore, when the diallyl phthalate was applied to the styrene it would invariably cause the styrene to dissolve on the surface, and to form cloudy and opaque products of unattractive appearance.

Finally, I discovered that by mixing together and applying cellulose acetate and diallyl phthalate under certain conditions specified below, I was able to obtain a clear, highly resistant coating, firmly bonded to the styrene. These coatings also were transparent and had desirable characteristics with reference to abrasion resistance, and inertness to solvents.

In a preferred embodiment of the invention, I mix 80% of diallyl phthalate and 20% of cellulose acetate. The said ingredients are dissolved in a suitable solvent combination comprising e. g. a ketone type solvent, for instance methyl ethyl ketone, methyl isobutyl ketone or acetone. If desired, I may also add on alcoholic solvent in proportion small enough not to interfere with the solubility of the solid.

Instead of methyl ethyl ketone, I may use ethyl acetate, isopropyl acetate, and some toluene if these are compounded with the less active solvents such as ethanol, methanol, ethyl lactate, nitromethane and the like in such proportions that the resultant composite solvent will not have so great a solvent power for polystyrene as to etch the plastic surface. As less volatile solvents to maintain a proper solvent balance, as evaporation of the solvent proceeds, I also use ethylene glycol mono ethyl ether, ethylene glycol mono butyl ether, and particularly ethylene glycol mono methyl ether, diacetone alcohol and ethyl lactate or any of these in suitable combinations, to provide the desirable degree of activity on styrene. It is impossible to give an absolutely precise range of solvent percentages, because of the great number of possible substitutions. The range will have to be established and the change in the content of any of the solvents will have to be balanced by corresponding changes in the other solvents. The examples show several modes of formulation, which are used successfully. With guidance of these suggestions the skilled chemist will be able to make an adjustment so as to balance several proportions of ingredients should it be necessary for him to make substitutions due to changing price or availability situations.

The test to be applied in this case by the chemist is so to balance his solvents that the desired combination of solids is fully soluble, while at the same time the solvent does not effect the styrene. If precipitation of solids occurs in the least volatile range of evaporation, then the ethylene glycol mono methyl ether or diacetone alcohol content should be increased. If styrene is attacked in this part of the evaporation "spectrum" then the ethylene glycol mono ethyl ether percentage or the ethyl lactate percentage should be increased. If the polystyrene is attacked in the early percentage of the evaporation range, then an aliphatic alcohol should be added, such as for example, ethyl alcohol, taking care in such additions not to precipitate the dissolved non-volatile materials.

The volatile nitro-aliphatic derivatives, such as for example nitro-methane, and nitro-propane, likewise, are highly useful solvents in these combinations, having excellent solvent power for cellulose and for phthalate esters, without excess tendency to attack styrene. Nitro methane is particularly inert to polystyrene, and in this regard is in the same class as the low molecular aliphatic alcohols and saturated aliphatic hydrocarbons.

The other requirement to be watched is that the coating applied be integrally bonded to the plastic. The term "integrally bonded," I understand as denoting that the coating is firmly attached to the underlying plastic, so as to constitute for practical purposes one part therewith, the bond being thus substantially as strong as either of the adjacent layers. Such an integrally bonded coating cannot be peeled off the underlying coating with a sharp instrument.

If the bond of the coating to the plastic does not meet this requirement, then the solvent balance should be adjusted in the direction opposite to that just mentioned, by increasing the percentage of solvents of the group including ethyl acetate, butyl acetate, toluene, ethylene glycol mono ethyl ether acetate, chlorinated solvents, and the like, or decreasing the solvents of the group of aliphatic alcohols-nitromethane so as to find a balance where for the particular grade of styrene contemplated and the particular solvent ingredients selected, at the same time a clear coating is obtained, and one which is integrally bonded to the styrene. With these data, and the guidance of the example given, the skilled chemist will be able to determine the desired combination in any solvent-resin variation.

An example of a preferred embodiment of the invention is given in the following:

Example 1

Solids:

| | Percent by weight |
|---|---|
| Cellulose acetate "Hercules LL-1" | 4½ |
| Diallyl phthalate, monomer refined (catalyzed with 2% "Luperco A. T. C." which is benzoyl peroxide suspended in oil) | 13½ |

Solvents:

| | |
|---|---|
| 2-nitropropane | 14 |
| Nitromethane | 18 |
| Denatured ethanol ("Solox") | 9 |
| Methyl ethyl ketone | 11 |

Dissolve solids and add:

| | |
|---|---|
| Cellosolve (ethylene glycol mono ethyl ether) | 22 |
| Butyl Cellosolve (ethylene glycol mono butyl ether) | 2 |
| Ethyl lactate | 6 |
| Total weight | 100 |

Total nonvolatile, 18%

An 8" x 12" panel of polystyrene was sprayed with the above composition. The solvent was then evaporated at 40° C. (½ to 1 hour). The coating was cured at 65–70° C. for 1½ to 2 hours, and was then sufficiently dry for handling. After 48 hours at room temperature it could not be scratched with the finger nails.

The coating was subjected to the following tests—

Abrasion resistance (A. S. T. M. Procedure D673–42T): The coating showed 16% higher resistance than a bare polystyrene surface.

Immersion in gasoline: The bare polystyrene immediately clouded and after several hours became swollen and soft. The coated polystyrene was unchanged.

Swabbing with carbon tetrachloride: The luster of the polystyrene was lost with the resulting clouding. The coating was unaffected.

Example 2

Solids:

| | Weight percent |
|---|---|
| Cellulose acetate "Hercules WH-2" | 1.5 |
| Diallyl phthalate, prepolymer (catalyzed with 5% benzoyl peroxide) | 8.5 |

Solvent:

| | |
|---|---|
| Ethylene glycol mono ethyl ether | 30 |
| Methyl ethyl ketone | 12 |
| Diacetone alcohol | 18 |
| Denatured ethanol ("Solox") | 20 |
| Ethyl lactate | 10 |
| Total | 100 |

Total nonvolatile, 10%

Drying time and temperature same as for Example 1.

Example 3

Solids

| | Percent by weight |
|---|---|
| Cellulose acetate "Hercules LL-1" | 2 |
| Zinc phosphor pigment | 1 |
| Diallyl phthalate, monomer refined (catalyzed with 2% Luperco A. T. C.) | 17 |

Example 3—Continued

Solvent:

| | Percent by weight |
|---|---|
| 1-nitropropane | 14 |
| Nitromethane | 20 |
| Denatured ethanol | 16 |
| Cellosolve (ethylene glycol mono ethyl ether) | 20 |
| Methyl ethyl ketone | 5 |
| Butyl lactate | 5 |
| Total | 100 |

Total nonvolatile, 20%

Drying time and temperature same as in Example 1.

While reference has been made specifically to diallyl phthalate as one of the ingredients it is understood that the inventive concept is much broader, and comprises the thought of using together with a film forming cellulose ester, a polymerizable liquid which in its unpolymerized state is an active solvent for polystyrene, but in its polymerized state is substantially a non-solvent therefor—in this manner, the said polymerizable liquid will initially to some degree penetrate the polystyrene surface, but the styrene insoluble cellulose ester will prevent such penetration from going far enough to cause any surface distortion. As evaporation proceeds, the polymerizable styrene solvent will change to its solid form, which is inactive on polystyrene. Since the liquid has already penetrated the styrene surface to some degree, this will now provide a firm anchorage and an integral bond between the polystyrene and the superimposed coating, and at the same time protect the polystyrene from attack by active solvents which may be included in the most slowly evaporating solvent fraction.

Diallyl phthalate is the preferred polymerizable liquid, because of its comparative stability, ready availability, ready polymerization at moderate temperatures and superior film characteristics. I may also employ any other polymerizable esters of aromatic acids, such as for example di-propargyl phthalate, or the monomers of film forming substances such as vinyl chloride, vinyl acetate, ethyl acrylate, methyl methacrylate, and combinations thereof.

The preferred ranges of percentages employed in the formulations are—

Solids:

| | Per cent |
|---|---|
| Cellulose acetate | 5-50 |
| Other cellulose esters with acids having less than 7 carbon atoms may be substituted for the cellulose acetate. | |
| Diallyl phthalate | 95-50 |
| A high volatility solvent combination, nonsolvent for polystyrene, for example— | |
|   A nitro aliphatic hydrocarbon having less than 4 carbon atoms | 75-35 |
|   An aliphatic alcohol having less than 4 carbon atoms | 5-20 |

Solvent:

| | Per cent |
|---|---|
| A high volatility solvent combination active on polystyrene— | |
|   A solvent selected from the group consisting of di ethyl ketone, methyl isobutyl ketone, acetone and methyl ethyl ketone, and aliphatic esters having a boiling point less than 130° C | 7-30 |
| A low volatility solvent selected from the group consisting of methyl, ethyl, and propyl lactate, diacetone alcohol glycol ethers and esters | 20-40 |

Usable though not preferred results are obtained within limits about 4% wider than the preferred range shown above.

The ratio of solid to solvent is entirely immaterial, as it will not affect the nature or the properties of the coating, but only its thickness.

While reference has been made throughout this application to polystyrene it is fully understood that this term includes such co-polymers or modified products as are commercially known under the generic term, styrene type resins. This includes co-polymers between styrenes and acrylates, polymers with acrylonitriles, and like materials known as being suitably co-polymerizable with styrene. The di-vinyl benzenes and their polymers and co-polymers are also included in the generic terms polystyrenes.

While this invention has specific reference to certain materials, which have been stated by way of example and not of limitation, it is fully realized that other substances may be added. The invention thus is not to be circumvented by the mere addition of recipient substances or even of substances which may be helpful in some regards such as pigments, modifiers, spreading agents or additions of other film forming substances such as acrylates, cellulose ethers, alkyd resins, rosin, alkyd resins, and the like.

The invention, thus, is to be limited only by the claims in which it is my intention to claim all novelty inherent in the invention as broadly as possible in view of prior art.

Having thus disclosed my invention, I claim:

1. An article of manufacture comprising a polystyrene surface and a coating integrally bonded thereto, said coating comprising cellulose acetate and polymerized diallyl phthalate.

2. An article of manufacture comprising a polystyrene surface and a coating integrally bonded thereto, said coating comprising a polymerized, film-forming polyester of an aliphatic alcohol and an aromatic polycarboxylic acid and a film-forming cellulose ester, said cellulose ester derived from an organic acid having 1 to 6 carbon atoms.

3. A coating composition comprising as essential ingredients, a film-forming polymerizable ester of an aliphatic alcohol and an aromatic polycarboxylic acid, an ester of cellulose with an organic acid having less than 7 carbon atoms, and a solvent for the said substances consisting essentially of from 15-35% of a nitro aliphatic hydrocarbon having less than 4 carbon atoms, from 5 to 20% of an aliphatic alcohol having less than 4 carbon atoms, from 7 to 30% of a solvent selected from the group consisting of diethyl ketone, methyl isobutyl ketone, acetone, and methyl ethyl ketone, and aliphatic esters having a boiling point less than 130° C., and from 20-40% of a solvent selected from the group consisting of methyl, ethyl and propyl lactate, diacetone alcohol, glycol ethers and esters.

4. A lacquer composition comprising as essential ingredients diallyl phthalate, a cellulose acetate, and a volatile solvent therefore consisting essentially of from 15-35% of a nitro aliphatic hydrocarbon having less than 4 carbon atoms, from 5 to 20% of an aliphatic alcohol having less than 4 carbon atoms, from 7 to 30% of a solvent selected from the group consisting of di-ethyl ketone, methyl isobutyl ketone, acetone, and methyl ethyl ketone and aliphatic esters having a boiling point less than 130° C., and from 20 to 40% of a solvent selected from the group consisting of methyl, ethyl and propyl lactate, diacetone alcohol, glycol ethers and esters.

5. The process of affixing to a polystyrene surface an integrally bonded protective coating therefor, which comprises the step of applying to said surface a solution, said solution comprising a polymerizable polyester of an aliphatic alcohol and an aromatic, polycarboxylic acid, and a cellulose ester derived from an organic acid having 1 to 6 carbon atoms, as solutes, together with a volatile solvent composition therefor, consisting essentially of from 15 through 35% of a nitro aliphatic hydrocarbon having less than 4 carbon atoms, from 5 to 20% of an aliphatic alcohol having less than 4 carbon atoms, from 7 to 30% of a solvent selected from the group consisting of diethyl ketone, methyl isobutyl ketone, acetone and methyl ethyl ketone, and aliphatic esters having a boiling point less than 130° C., and from 20–40% of a solvent selected from the group consisting of methyl, ethyl and propyl lactate, diacetone alcohol, glycol ethers and esters.

LUTHER L. YAEGER.

REFERENCES CITED

The following references are of record in the file of this patent:

UNITED STATES PATENTS

| Number | Name | Date |
|---|---|---|
| 1,873,689 | Walsh | Aug. 23, 1932 |
| 2,005,414 | Dykstra | June 18, 1935 |
| 2,111,446 | Gloor | Mar. 15, 1938 |
| 2,115,710 | Dreyfus | May 3, 1938 |
| 2,320,533 | Muskat et al. | June 1, 1943 |
| 2,354,824 | Muskat | Aug. 1, 1944 |
| 2,355,330 | Rehberg | Aug. 8, 1944 |
| 2,367,798 | Rehberg | Jan. 23, 1945 |
| 2,374,081 | Dean | Apr. 17, 1945 |
| 2,443,736 | Kropa | June 22, 1948 |

FOREIGN PATENTS

| Number | Country | Date |
|---|---|---|
| 294,261 | Great Britain | Oct. 21, 1929 |
| 482,194 | Great Britain | Mar. 21, 1938 |

OTHER REFERENCES

Hercules Cellulose Acetate (1941), p. 10.